United States Patent [19]

Lewin

[11] 3,903,817

[45] Sept. 9, 1975

[54] METHOD AND DEVICE FOR SOIL IMPROVEMENT

[76] Inventor: Gunnar E. W. Lewin, Pipersgatan 11, 112 24 Stockholm K, Sweden

[22] Filed: Oct. 26, 1973

[21] Appl. No.: 410,024

[30] Foreign Application Priority Data
Nov. 1, 1972 Sweden.............................. 14149/72

[52] U.S. Cl. .................................................. 111/7
[51] Int. Cl.² ........................................ A01C 23/02
[58] Field of Search .................. 111/1, 7, 6; 47/58.5

[56] References Cited
UNITED STATES PATENTS
| | | |
|---|---|---|
| 828,329 | 8/1906 | Mohr .................................... 111/86 |
| 1,204,772 | 11/1916 | Hornecker .............................. 111/7 |
| 1,287,930 | 12/1918 | Evans ..................................... 111/7 |
| 2,322,256 | 6/1943 | Rubens ................................... 111/7 |
| 3,146,740 | 1/1964 | Phillips ................................... 111/7 |
| 3,793,967 | 2/1974 | Van Den Berg ........................ 111/7 |

*Primary Examiner*—Stephen C. Pellegrino
*Attorney, Agent, or Firm*—Berman, Bishoff & Platt

[57] ABSTRACT

A method and device for soil improvement, particularly for lawns. The upper layer of soil including the grass roots is sliced by means of a knife which is conveyed below the root system and parallel to the horizontal. Uncompressed material which may include nutritive agent is introduced into the opening that is formed.

4 Claims, 4 Drawing Figures

METHOD AND DEVICE FOR SOIL IMPROVEMENT

BACKGROUND OF THE INVENTION

1. Field of the Invention

This invention refers to a method and a device for soil improvement with the purpose of increasing vegetation, especially the grass growing in lawns.

The conventional manner of supplying nutritive agents to lawns, i.e. to fertilize them, is to spread out the nutritive agent in various ways over the lawns so that water will carry the nutritive agent with it to the root system when the lawn is watered or when rain falls. However, when this procedure is followed, a substantial portion of the nutritive agent will remain not only on the blades of grass themselves, but also in the layer comprised of older grass which is located above the layer of soil and which acts as a filter. In dry periods or if the water for watering down the nutritive agent is not supplied soon enough, some nutritive agents may burn the plants of grass.

It is also possible to water the lawn with a nutritive solution, but the disadvantages indicated above arise in this case as well.

2. Description of the Prior Art

Devices for supplying air to the root system of grass are available in a plurality of embodiments. These devices are frequently of the type by means of which holes are punched in the lawn and plugs of soil are taken out or grooves are formed in the lawn by means of slicing by knives for supplying air. The disadvantages of these devices are that the relatively small channels that are formed become clogged fairly quickly as the result of the motion of the earth as well as by the effect of people walking or running around, for example golf players or football players.

SUMMARY OF THE INVENTION

The object of this invention is to eliminate the above-mentioned disadvantages by disclosing a method and a device for soil improvement with the purpose of increasing vegetation, particularly with regard to lawns. In accordance with the invention a layer of sand, peat mould, or the like is supplied directly to the system of all the roots in the entire lawn. If desired, these materials may be provided with an appropriate fertilizer. In connection with this treatment the lawn may be groomed and if necessary also packed by a roller. As the result of the method and device disclosed by the invention it becomes possible continuously to provide the root system with the necessary supply of air and simultaneously to provide the roots directly with the necessary nutritive agent by adding the nutritive agent to for instance water.

BRIEF DESCRIPTION OF THE DRAWING

The invention will be described more specifically below with reference to the accompanying drawing, in which.

DESCRIPTION OF THE PREFERRED EMBODIMENT

Figure 1:
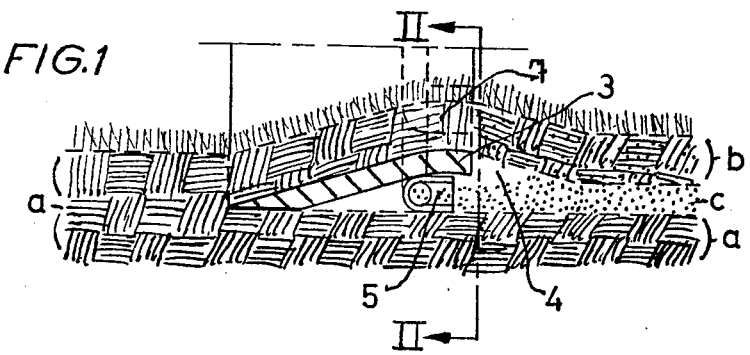
FIG. 1 shows a section of a layer of soil which is sliced by means of a knife structure comprising an embodiment of the invention.
Figure 2:
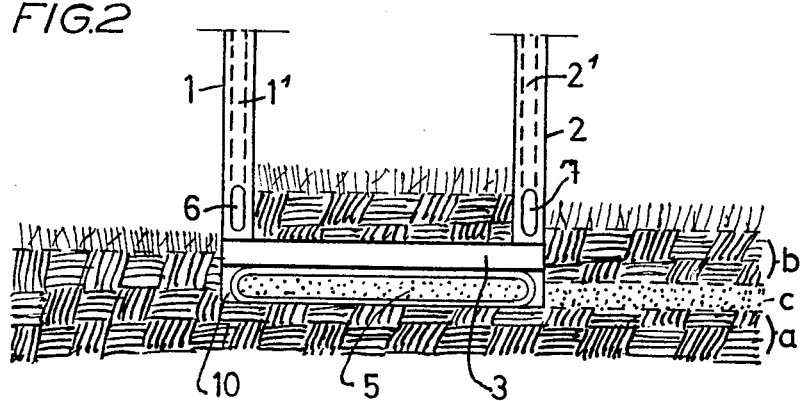
FIG. 2 is a sectional view taken along the line II—II of FIG. 1.
Figure 3:
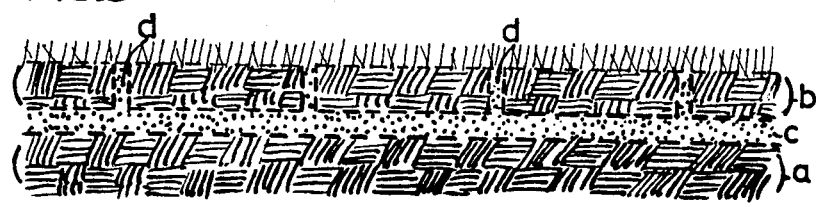
FIG. 3 shows a cross section of a lawn with a layer of soil being treated in accordance with the invention, and FIG. 4, finally, shows a second embodiment of a structure in accordance with the invention.

FIGS. 1, 2 and 3 show a layer of soil $a$ below a lawn $b$, between which a layer $c$ of sand or peat mould or similar is to be introduced in accordance with the invention, said layer having been mixed with any necessary nutritive agents with the purpose of promoting the vegetation or growth of the lawn.

One or more knife structures in accordance with FIGS. 1 and 2 are mounted under a tractor, said knife structures consisting of two knives 1 and 2, respectively, which at their rearmost portions are provided with pipes supporting a knife 3 between their lowermost ends, said knife slanting slightly with regard to the horizontal plane and being shaped such, that it can slice and lift up the lawn $b$, thereby providing a space 4 in which said layer $c$ of sand or peat mould or similar may be disposed by the corresponding material being introduced through the pipes of the knives 1 and 2 and in due course being dispensed through a nozzle 5 in a transverse pipe 10 which interconnects said knives 1 and 2 that include pipes, said pipe 10 being located below knife 3. The pipes located in knives 1 and 2 are designated 1' and 2', respectively, in FIG. 2, and are each provided with a rearwardly directed nozzle 6 and 7 above knife 3, counting in the direction of motion of said knife 3, with said sand or peat mould or similar being dispensed through said nozzles into the vertical channels $d$ that are shown in FIG. 3. In a pratical embodiment the layer $b$ may have a thickness of for example between 1 and 2 inches, the layer $c$ may have a thickness of approximately 0.4 inches and the channels $d$ may have a thickness of slightly less than 0.4 inches. If desired, the knife 3 and the transverse pipe 10 may be formed integrally.

Figure 4:
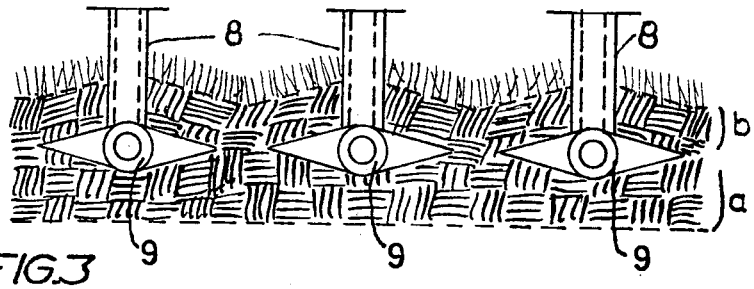

FIG. 4 shows a knife structure comprising torpedo-like plow pipes 8 which are conveyed in similar manner as described in connection with the device of FIGS. 1–3, with said plow pipes 8 providing the layer of soil $a$ with a layer consisting of appropriate filling agent and nutritive agents by the corresponding material being fed down through the pipes 8 and out through individual nozzles 9.

The knife structures in the two embodiments described above may appropriately be provided with vibrative means so as to facilitate cutting through the soil layer. The securing means of the respective knife structures may appropriately be articulated and suspended in springs in order to be able to bounce off when obstructions in the form of stones or similar occur, whereafter they may regain their original positions. In order to make it possible to treat lawns sequentially, the vehicle on which the structures in accordance with the invention are mounted may also be provided with a unit for sowing and grooming as well as for necessary levelling by means of a roller, whereby a machine handled by one man can take care of a large lawn in a reasonable time.

The invention is not restricted to the embodiments described above and illustrated in the drawing, and these merely comprise examples of the invention and its utilization.

I claim:

1. A device for cutting continuous vertical channels and a continuous horizontal channel uniting said vertical channels under the root system of a grass lawn and for feeding a continuous layer of uncompressed material into the vertical channels and the horizontal channel, comprising a pair of spaced hollow carrier knife and pipe combinations, each pipe of said combinations being disposed generally vertically, having a forwardly facing vertical cutting edge formed at one side and having a bore open at the top and bottom, an elongated, substantially horizontal knife for slicing a layer under a grass root system near the surface of the ground, said knife having a forwardly facing horizontal cutting edge and an upwardly and rearwardly inclined blade, an elongated, substantially horizontal pipe having a bore and being disposed beneath said knife, said horizontal pipe being connected at its ends to said pair of pipes of the pipe and knife combinations in such manner that the bore of each vertical pipe communicates with the bore of the horizontal pipe, and a rearwardly facing nozzle on said horizontal pipe for discharging uncompressed material, said upwardly inclined blade of the knife serving to lift a surface layer of the ground for introduction of said uncompressed material to the resulting open space below the layer of ground as the horizontal knife is drawn forward in the direction of the knife edges on the vertical pipes.

2. A device as constructed in claim 1 wherein said nozzle is elongated and extends substantially for the full length of the horizontal pipe, and said vertical pipes of said pipe combinations are each provided with a nozzle opening to its bore rearwardly and opposite the cutting edges of said pipes, said last named nozzles being located close to the points of connection of said pipes with said substantially horizontal pipe and above the horizontal knife.

3. A device as set forth in claim 2 wherein said horizontal pipe is disposed below the knife between the inner surface of the knife and a horizontal plane intersecting the cutting edge.

4. A device as set forth in claim 1 wherein the vertical cutting edges are integrally formed on said pipes of the knife and pipe combinations.

* * * * *